United States Patent Office 2,777,880
Patented Jan. 15, 1957

2,777,880
PRODUCTION OF AROMATIC COMPOUNDS

Peter Smith, Norton-on-Tees, England, assignor to Imperial Chemical Industries Limited, a corporation of Great Britain No Drawing. Application June 18, 1953,
Serial No. 362,663

Claims priority, application Great Britain August 5, 1952

16 Claims. (Cl. 260—592)

This invention relates to the production of aromatic compounds.

It has already been disclosed that quinaldinic acid may be converted to diphenyl-2-quinolylcarbinol, by heating with benzophenone at an elevated temperature of 175° C. Similarly, picolinic acid may be converted to phenyl-2-pyridylcarbinol by reaction with benzaldehyde, and to phenyl-2-pyridylmethyl carbinol by reaction with acetophenone. Attempts to carry out such reactions with acids other than alpha-imino acids have hitherto been unsuccessful, and it has been suggested that reactions of this type are specific to alpha-imino acids, such as quinaldinic acid and picolinic acid.

In contrast to this, we have now found that in the presence of suitable catalysts, aromatic carboxylic acids other than alpha-imino acids may be reacted with aldehydes and ketones to give substantial amounts of carbinols, or decompositions products thereof, such as dehydrogenation or dehydration products.

According to the present invention, there is provided a process for the production of aromatic compounds, which comprises the step of reacting an aromatic carboxylic acid with a carbonyl compound selected from the group consisting of aldehydes and ketones at an elevated temperature in the presence of a decarboxylation catalyst.

Aromatic compounds which may be produced are carbinols, olefines and ketones. Thus, on reacting benzoic acid with acetaldehyde according to the process of the present invention, the initial product is a methyl phenyl carbinol, which under the conditions of reaction may be dehydrogenated to acetophenone or dehydrated to styrene. Similarly, if benzoic acid is reacted with acetone, the initial product is believed to be phenyl dimethyl carbinol, which is then believed to undergo decomposition to give acetophenone and methane. Thus, the aromatic compounds which may be produced by the process of the present invention are carbinols, olefines, or ketones; in particular, the invention provides a process for the production of ketones.

Decarboxylation catalysts suitable for use in the present invention are those comprising cromic oxide, such as cadmium chromite, zinc chromite, zinc iron chromite, and zinc cadmium chromite, or cadmium oxide, such as cadmium oxide supported on zinc oxide. As an alternative, catalysts comprising copper may be employed; thus a catalyst comprising a reduced mixture of copper oxide and zinc oxide is particularly suitable. As a further alternative, catalysts comprising a hydrogenating metal of group VIII of the periodic system may be employed. For example, nickel may be employed either alone in a finely divided form, or supported on an inert material, such as kieselguhr.

The process of the present invention is preferably carried out in the vapour phase, at a temperature in the range of 260 to 500° C., and preferably of the order of 400° C. It is preferable to employ an excess of carbonyl compound; the reaction may be carried out, for example by vaporising the aromatic acid in a stream of vaporised carbonyl compound. If desired, a solvent such as toluene may be employed for the reaction mixture.

Thus, by the process of the present invention, benzoic acid may be reacted with acetaldehyde at a temperature of 400° C. in the presence of a reduced copper oxide-zinc oxide catalyst, whereby acetophenone is produced.

It is to be understood that the invention is not dependent on any particular theory for explaining reactions of the type covered by this application; with this proviso, it may be stated that the reaction in the case of benzoic acid and acetaldehyde possibly takes place as follows: benzoic acid is decarboxlated, according to the equation:

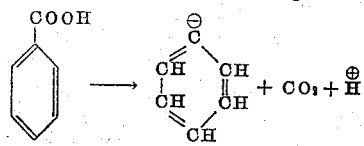

and that the anion then reacts with acetaldehyde to give phenyl methyl carbinol according to the equation:

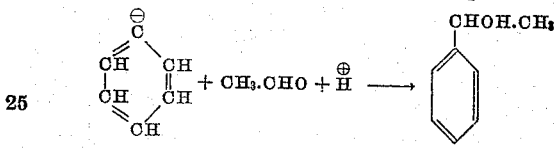

Since the catalyst may be capable of catalysing dehydrogenation reactions, the phenyl methyl carbinol formed in this way may be partially or completely dehydrogenated to acetophenone. On the other hand, if the catalyst is capable of catalysing dehydration reactions, the phenyl methyl carbinol may be partially or completely dehydrated to styrene.

Other aromatic carboxylic acids which may be used in the process of the present invention are, for example, substituted benzoic acids, in which one or more substituent groups selected, for example, from alkyl, halogen and nitro are present. Halogen and nitro groups may undergo reaction during the process of the present invention, owing to the presence of a reducing agent in the reaction mixture. Thus, a halogen substituent may be replaced by hydrogen, and a nitro group may be reduced to an amino group. For example, if p-chlorobenzoic acid is reacted with acetaldehyde in the process of the present invention, the product comprises acetophenone. Other aromatic acids which may be used in the present invention are the unsubstituted or substituted naphthoic acids.

In the process of the present invention, a wide range of aldehydes and ketones may be employed. Thus, in place of acetaldehyde, other aldehydes such as formaldehyde, propionaldehyde and benzaldehyde may be employed. With a reduced copper oxide-zinc oxide catalyst, the reaction between benzoic acid and benzaldehyde yields benzophenone; the compound is presumably formed via diphenyl carbinol. Ketones, such as acetone, may also be used in the present invention. When, for example, acetone and benzoic acid are reacted under the conditions disclosed, the product comprises acetophenone. It is believed that the initial product is phenyl dimethyl carbinol, which then undergoes decomposition to yield acetophenone.

It will be understood that, in the process of the present invention, when a catalyst is used which is capable of catalysing dehydrogenation reactions, an alcohol may be used as starting material in place of an aldehyde or ketone, since under the conditions of reaction the alcohol will undergo dehydrogenation to yield an aldehyde or ketone. Thus, when using a reduced copper oxide-zinc oxide catalyst, ethyl alcohol may be used as starting material in place of acetaldehyde. The ethyl alcohol undergoes dehydrogenation to give acetaldehyde, which then undergoes reaction with the aromatic carboxylic acid.

By-products in the process of the present invention include the aromatic hydrocarbon formed by decarboxylating the aromatic acid, and carbinols or derivatives thereof produced from the aromatic acid and dimers or higher condensation products of the carbonyl compound. Thus, when acetaldehyde and benzoic acid are used as starting material, the product may contain some propenyl phenyl carbinol, or propenyl phenyl ketone: these products may be produced via crotonaldehyde, formed by the condensation of two molecules of acetaldehyde, followed by the elimination of water.

*Example 1*

A solution of 30 grams of acetaldehyde and 28.5 grams of benzoic acid in 110 mls. of toluene was fed at a space velocity of 1.1 litres per hour per litre of catalyst-filled space into a converter maintained at a temperature of 400° C. The converter was a cylindrical tube 33 inches long and 1.25 inches in diameter containing a copper oxide-zinc oxide catalyst, which had been reduced prior to use; this catalyst was in the form of $3/16''$ pellets. Nitrogen was passed through the system at a rate of 10 litres per hour.

The organic product was condensed and the amount of unchanged benzoic acid present in this condensate determined by measuring its acid value. The condensate was then submitted to fractional distillation whereby acetophenone and benzene were isolated. The conversion of the benzoic acid employed in this example was 97%; the yields of acetophenone and benzene, based on the amount of benzoic acid converted, were 34% and 25% respectively.

From the residue from the fractional distillation, 1 gram of phenyl propenyl ketone was isolated.

*Example 2*

A solution of 57 grams of benzoic acid and 100 mls. of acetone in 114 grams of toluene was fed through a converter as described in Example 1. The catalyst and conditions were the same as those employed in Example 1, except that the duration of the experiment was one hour. The products were condensed and the unchanged benzoic acid was estimated by a determination of the acid value of the condensate. The amount of benzoic acid was 8 grams. From the condensate 3.1 grams of acetophenone were isolated.

*Example 3*

Example 2 was repeated, using 100 mls. benzaldehyde in place of 100 mls. acetone. From the product, benzophenone and unchanged benzoic acid were recovered. The former was characterised as the 2,4-dinitro phenyl hydrazone, melting point 243° C.

*Example 4*

A solution of 31 grams of benzoic acid in 69 grams of ethanol was fed during one hour through a converter as described in Example 1, the conditions being the same as those in the said example. The catalyst employed was cadmium oxide in the form of $1/8''$ cylindrical pellets. The product was condensed and the unchanged benzoic acid estimated by a determination of the acid value of the condensate: 2.5 grams of benzoic acid were found to be unchanged. From the condensate 3.7 grams of acetophenone, characterised as the 2,4-dinitro phenyl hydrazone, were isolated.

*Example 5*

Example 1 was repeated using a zinc iron chromite catalyst (Zn:Fe:Cr=80:20:100). The organic product was condensed and the amount of unchanged benzoic acid was determined by measuring its acid value. The condensate was fractionally distilled, whereby acetophenone and benzene were isolated; the conversion of benzoic acid employed in this example was 98%. The yields of acetophenone and benzene based on the amount of benzoic acid converted were 34% and 26% respectively.

I claim:

1. A process for the production of aromatic ketones which comprises the step of reacting an aromatic carboxylic acid selected from the group consisting of benzoic acid, alkyl substituted benzoic acid, halogen substituted benzoic acid, nitro substituted benzoic acid and naphthoic acid with a member of the class consisting of acetone, aldehydes having the formula RCHO, wherein R is selected from the class consisting of hydrogen, lower alkyl and phenyl and an alcohol selected from the group consisting of primary and secondary lower alkanols and benzyl alcohol, said reaction being carried out at a temperature between about 260° C. and about 500° C. in the presence of a decarboxylation catalyst selected from the group consisting of chromium oxide, cadmium chromite, zinc chromite, iron chromite, zinc cadmium chromite, zinc iron chromite, cadmium oxide, copper, a reduced copper oxide-zinc oxide mixture, and a metal of group VIII of the periodic system.

2. The process of claim 1, wherein the reaction temperature is about 400° C.

3. The process of claim 1, wherein the catalyst comprises copper in the form of a reduced copper oxide-zinc oxide mixture.

4. The process of claim 1, wherein the catalyst comprises zinc iron chromite.

5. A process as claimed in claim 1 in which the catalyst comprises cadmium oxide.

6. The process of claim 1, wherein the aromatic acid is reacted with acetaldehyde.

7. The process of claim 1, wherein the aromatic acid is reacted with acetone.

8. The process of claim 1 wherein the aromatic acid is reacted with an alcohol as defined in said claim 1.

9. The process of claim 1, wherein the alcohol is ethyl alcohol.

10. The process of claim 1, wherein the aromatic acid is benzoic acid.

11. The process of claim 10, wherein the benzoic acid is reacted with acetaldehyde.

12. The process of claim 11, wherein the catalyst is zinc iron chromite.

13. The process of claim 1, wherein benzoic acid is reacted with acetaldehyde in the presence of reduced copper oxide-zinc oxide.

14. The process of claim 1, wherein benzoic acid is reacted with acetone.

15. The process of claim 6, wherein the catalyst is zinc iron chromite.

16. The process of claim 1, wherein benzoic acid is reacted with acetone in the presence of reduced copper oxide-zinc oxide as a catalyst.

References Cited in the file of this patent

UNITED STATES PATENTS 2,341,016    Brubaker _____ Feb. 8, 1944